United States Patent

Markey et al.

[11] Patent Number: 5,970,996
[45] Date of Patent: Oct. 26, 1999

[54] THROTTLING VALVE FOR COMPRESSED AIR OR THE LIKE AND ITS APPLICATION TO AN AIRJET LOOM

[75] Inventors: Hugo Markey, Langemark; Jozef Peeters, Ieper; Dirk Lewyllie, Wervik, all of Belgium

[73] Assignee: Picanol NV, Ieper, Belgium

[21] Appl. No.: 08/793,801

[22] PCT Filed: Sep. 13, 1995

[86] PCT No.: PCT/EP95/03598

§ 371 Date: Mar. 17, 1997

§ 102(e) Date: Mar. 17, 1997

[87] PCT Pub. No.: WO96/08668

PCT Pub. Date: Mar. 21, 1996

[30] Foreign Application Priority Data

Sep. 16, 1994 [BE] Belgium ................................. 9400835
May 4, 1995 [BE] Belgium ................................. 9500404

[51] Int. Cl.⁶ .................................................... F16K 31/12

[52] U.S. Cl. ...................... 137/1; 137/487.5; 251/129.11; 251/122; 139/435.2

[58] Field of Search .................... 139/435.2; 251/129.11, 251/122, 129.12, 129.13; 137/487.5, 1

[56] References Cited

U.S. PATENT DOCUMENTS

| 3,080,952 | 3/1963 | Carlstedt | 251/129.11 |
| 4,779,642 | 10/1988 | Wood | 251/122 |
| 4,969,628 | 11/1990 | Reich | 251/122 |
| 5,034,897 | 7/1991 | Sainen | 139/435.2 |
| 5,060,910 | 10/1991 | Iwata et al. | |
| 5,086,812 | 2/1992 | Van Bogaert | 139/435.2 |
| 5,152,309 | 10/1992 | Twerdochlib | 137/487.5 |
| 5,320,142 | 6/1994 | Sainen | 139/435.2 |
| 5,351,705 | 10/1994 | Reinders | 137/487.5 |
| 5,364,066 | 11/1994 | Dorste | 251/122 |

FOREIGN PATENT DOCUMENTS

| 0 623 989 A1 | 11/1994 | European Pat. Off. |
| 89 09 351 | 10/1989 | Germany . |
| 57-18170 | 4/1984 | Japan . |
| 2206709 | 1/1989 | United Kingdom ............. 251/129.11 |

Primary Examiner—Denise L. Ferensic
Assistant Examiner—Ramyar Farid
Attorney, Agent, or Firm—Bacon & Thomas, PLLC

[57] ABSTRACT

A throttling valve (11) in particular for an airjet loom includes an electric drive (27) for two valve components (17, 19) subtending a throttling gap (25), the drive including motor displaceable in predetermined positions by means of a control and/or regulation unit for setting throtting gaps (25) of predetermined sizes.

8 Claims, 5 Drawing Sheets

THROTTLING VALVE FOR COMPRESSED AIR OR THE LIKE AND ITS APPLICATION TO AN AIRJET LOOM

BACKGROUND OF THE INVENTION

Field of the Invention

The invention concerns a throttling valve for compressed air or the like and comprising a first valve component and a second valve component which together subtend an adjustable throttling gap, further an electric drive to displace at least one of the valve components for the purpose of adjusting the size of the throttling gap.

Electromagnetically driven throttling valves are already known, which comprise an armature fitted at its end with a plunger subtending a throttling gap together with a stationary component. The plunger-fitted armature can be displaced against a spring force by means of a current-fed coil. As a rule the spring biases the armature toward the closed position. The plunger position is controlled by changing the current in the coil. Thereupon the plunger assumes a position wherein the magnetic force and the spring force are balanced.

As regards such throttling valves, the plunger position and hence in fact the adjusted magnitude of the throttling gap depends on the tolerances for the spring constants and the tolerances affecting the magnetic drive. Most of the time comparatively complex control of the applied current is also required in order that a constant force be applied to the armature by means of a constant current into the coil regardless of coil temperature.

In such throttling valves, furthermore, the applied feed pressure of the compressed air and the flow of the compressed air through the throttling valve will affect the plunger position. This feature is especially disadvantageous when the feed pressure and/or the magnitude of the throttling aperture are changing.

Moreover such throttling valves evince hysteresis, and as a result the precise plunger position is determined not only by the coil current but also by the plunger's direction of motion.

Again the plunger position of such throttling valves will be affected by vibrations. Therefore such throttling valves are poorly suited for use in looms because looms generate vibrations by the beat motion of the reed and/or by displacements of the weaving frame.

BRIEF SUMMARY OF THE INVENTION

The object of the invention is to create a throttling valve of the initially cited species making it possible to accurately set predetermined throttling gaps and such that the valve is vibration-insensitive.

This problem is solved by the electric drive comprising a motor displaceable by a control and/or regulation unit into predetermined positions in order to set throttling gaps of predetermined sizes.

In such a throttling valve, throttling gaps may be set precisely and then may be kept accurately in place even if the throttling valve is mounted in a vibration-generating loom. The size of the adjusted throttling-gap furthermore is insensitive to changes in the feed pressure of the compressed air and/or into the flow of compressed air. As a result the magnitude of the throttle aperture and thus the degree of throttling can be set precisely.

In a preferred embodiment of the invention, the electric drive includes a stepping motor. The desired sizes of the throttling gap can be obtained very accurately using such a stepping motor.

Where an especially fine control of the throttling-gap sizes is desired, another embodiment of the invention provides that a reducing gear be mounted between the motor and the valve component it displaces. As a result and in particular when using a stepping motor, the design-determined angular motor motions between the individual steps can be reduced to comparatively small adjustment displacements of the valve component(s). Another advantageous embodiment provides a helicoidal gear set between the plunger and the motor. This helicoidal gear set offers the advantage that it directly converts the motor rotation into translation.

In a further embodiment of the invention, the two valve components are a plunger and an essentially cylindrical valve seat which are mutually axially displaceable to adjust the throttling gap.

In yet another embodiment of the invention, the two valve components are fitted with seals that can be moved so they touch each other. This feature allows one to transfer the throttling valve into a shutoff position.

In still another embodiment of the invention, the throttling valve is used in an airjet loom and precedes a main blowing nozzle connected to a source of compressed air by at least one main valve feeding high-pressure compressed air to the main blowing nozzle or by throttling valve feeding compressed air of lower pressure to the main blowing nozzle.

Airjet looms comprise one or more main blowing nozzles each inserting one filling thread into a shed. During filling insertion, these main blowing nozzles are loaded with high-pressure compressed air, for instance between 2 and 7 bars. Moreover it is known to load the main blowing nozzle precisely when it is not inserting a filling with compressed air of lower pressure, for instance 0.02 to 1 bar. The purpose of this lower pressure is to prevent the filling thread from dropping out of the main blowing nozzle during the time interval in which this main blowing nozzle is not inserting a filing. For that purpose a manually adjustable pressure reducer is installed, in addition to a first line containing a main valve, in a second line leading to the main blowing nozzle(s) and issuing from the same source of compressed air. The loom operator must manually adjust the lower pressure in such manner that on one hand the filling shall not drop out of the main blowing nozzle during weaving while on the other hand this filling shall not fray and be destroyed during loom shutdown for instance when remedying a broken filling thread or the like. For this reason the lower pressure also must be provided in such manner that during prolonged application of the low-pressure compressed air to the filling in the main blowing nozzle, said filling shall not fray and be destroyed. Setting a lower-pressure value that meets both conditions is exceedingly difficult. Most of the time the adjusted lower pressure will be too low to reliably keep the filling in the main blowing nozzle during weaving, while on the other hand will be so high that this filling will fray and be destroyed during loom shutdown.

It is further known to install a second feed line with a second pressure reducer parallel to the feed line with the pressure reducer. In that case one of the pressure reducers is set to a lower pressure reliably preventing the filling from dropping out of the main blowing nozzle during weaving, the other pressure reducer being set to a lower pressure that will not fray or destroy the filling present in the main blowing nozzle during loom shutdown. To meet these functions, shutoff valves also must be mounted in the particular feed lines to allow shutting them off as needed. Additionally yet, check valves must be installed in each feed line to prevent high-pressure compressed air from being blown into these feed lines when the main valve is open. Such a design already entails substantial complexity for a main blowing nozzle alone and requires much space. When a loom comprises several main blowing nozzles, this design becomes impractical.

The above problems are easily solved by the throttling valve of the invention. Throttling gaps of predetermined size optimally matching the particular operating conditions can be implemented by means of the control and/or regulating unit. A throttling-gap size may be set which shall in turn set a pressure reliably causing the filling to be held in the main blowing nozzle during weaving. A further throttling gap of predetermined size may be adjusted and thereby a lower pressure may be predetermined which, in the case of loom shutdown, allows reliably holding the filling in the main blowing nozzle without however fraying or destroying it. It is feasible moreover to set a further predetermined throttling-gap size in turn setting a pressure level for instance between those of the two above cited pressures and allowing one, following filling rupture or the like, to suck a filling into the main blowing nozzle. Lastly the throttling valve also can be moved into a shutoff position.

BRIEF DESCRIPTION OF THE DRAWINGS

Further features and advantages of the invention are elucidated in the following description of the embodiments shown in the drawings, where.

DETAILED DESCRIPTION

Figures 1, 3:
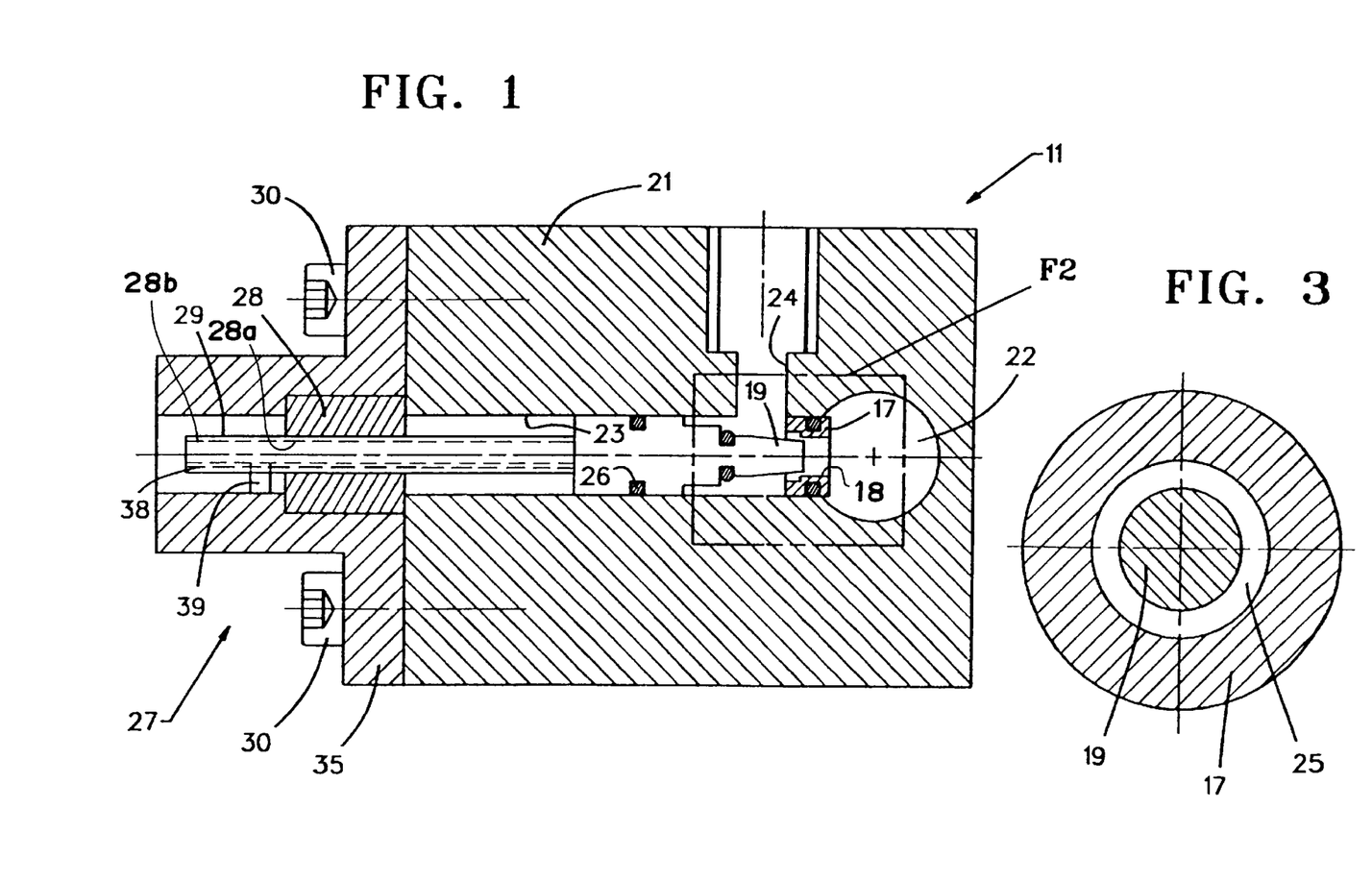
FIG. 1 is a schematic axial section of a throttling valve with its associated drive.
FIG. 3 is a section along line III—III of FIG. 2.

The throttling valve 11 shown in FIG. 1 contains two valve components, namely a stationary valve seat 17 having a cylindrical inside surface 18 and an adjustable plunger 19 having a conical segment 20 and an adjoining cylindrical segment 33. The conicity of the conical segment 20 is between 3 and 30° and preferably it is 5°. The diameter of the cylindrical plunger segment 33 matches the cylindrical inside diameter 18 of the valve seat 17 in such manner that in the position shown in FIG. 4, the cylindrical segment 33 shall be displaceable with little play within the inside surface 18 of the valve seat. Moreover the valve seat 17 is fitted with an annular clearance 34 concentric to said seat's axis and present on the end surface facing the plunger 19.

The throttling valve 11 comprises a housing 21 fitted with a first borehole 22 communicating in a manner not shown in further detail with a compressed-air feed device. A second borehole 23 runs transversely to the first borehole 22 and communicates with it and receives the plunger 19. The valve seat 17 is located in the region where the boreholes 22 and 23 are connected to each other. Said valve seat 17 is pressed into the borehole 23. However any other affixation may be used, for instance bonding. The plunger 19 is axially displaceable into the valve seat 17 and as a result a throttling gap 25 shown in FIG. 3 is subtended between the inside cylindrical surface 18 of the valve seat and the conical segment 20 of the plunger 19. A third borehole 24 is configured in such manner transversely to the borehole 23 that the valve seat 17 is located between the borehole 22 and the borehole 24.

The compressed air arriving from a compressed-air source is fed from the first borehole 22 through the throttling gap 25, subtended between the cylindrical inside surface 18 of the valve seat 17 and the conical segment 20 of the plunger 19, and then to the third borehole 24. Throttling takes place as the compressed air passes through the throttling gap 25. The compressed air arriving from the compressed-air source and flowing through the restricted throttling gap 25 therefore is throttled to a lower pressure and thereupon it is guided at that lower pressure through the third borehole 24 toward an air consuming means, for instance a loom main blowing-nozzle. In its zone guided within the borehole 23, the plunger 19 is fitted with an annular seal 26 to prevent compressed air from escaping out of the borehole 23.

The plunger 19 can be moved by a drive 27 actuated by a control and/or regulating unit. The drive 27 contains a stepping motor having a rotor 28 meshing by a helicoidal inside thread 28a with an outer helicoidal thread 28b of a plunger rod 29. The plunger rod 29 is fitted with a longitudinal groove 38 engaged by a pin 39 to prevent the plunger rod 29 from rotating. The stepping-motor rotor 28 is axially fixed in the stepping-motor housing 35 and as a result rotations by the rotor 29 are converted into axial displacements of the plunger rod 28 and hence of plunger 19. The stepping-motor housing 35 is affixed by screws 30 on the housing 21 of the throttling valve 11.

The design of the stepping motor and of the helicoidal gear set between the rotor 28 and the plunger rod 29 is such that one rotational step of the step motor is reduced into an axial displacement of about 0.01 mm to 0.05 mm, for instance 0.03 mm. The angular displacement of one step of the stepping motor as well as the pitch of the rotor 28 and of the thread of the plunger rod 29 are designed commensurately. The rotation of the rotor 28 entails displacing the plunger 19 relative to the valve seat and as a result the throttling aperture 25 will have been set. The drive allows displacing the plunger relative to the valve seats in steps of hundredths of a mm.

Figure 5:
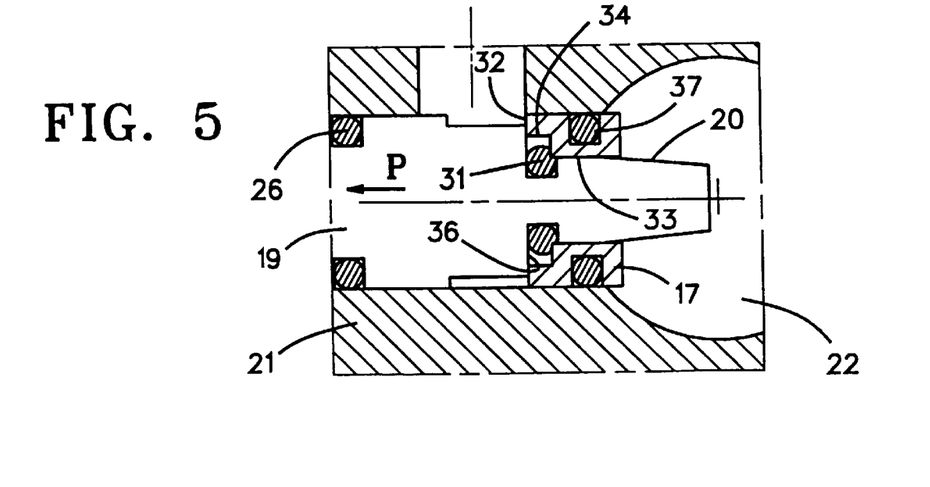
FIG. 5 is a section corresponding to FIGS. 2 and 4 with the valve components in still another position.

The throttling valve 11 is displaceable into a shutoff position in order to fully shut off the flow of compressed air from the borehole 22 to the borehole 24. The plunger 19 is fitted with an annular seal 31 placed in an annular groove 34 at the proximal end of the plunger and cooperating with a radial surface 40 of the annular groove 34 as shown in FIG. 5. The annular seal 31 is freely displaceable inside the annular groove 34 of the valve seat 17 until the above sealing effect takes place. In the shutoff position, a rigid annular shoulder 36 of the plunger rests against the rigid end surface 32 of the valve seat 17. As elucidated below, this position is the spatially fixed reference position. A sealing ring 37 is additionally provided between the valve seat 17 and the borehole 23.

The annular seal 31 already will cooperate with the radial surface 40 before the annular shoulder 36 of the plunger 19 comes to rest against the end surface 32 of the valve seat. The outside diameter of the annular seal 31 is larger than the axial depth of the annular groove 34. The elasticity of the annular seal 31 allows displacing the plunger 19 between the position wherein the annular seal 31 already rests against the radial surface and the position in which the annular shoulder 36 of the plunger 19 rests against the end surface 32 of the valve seat 17.

Figure 2:
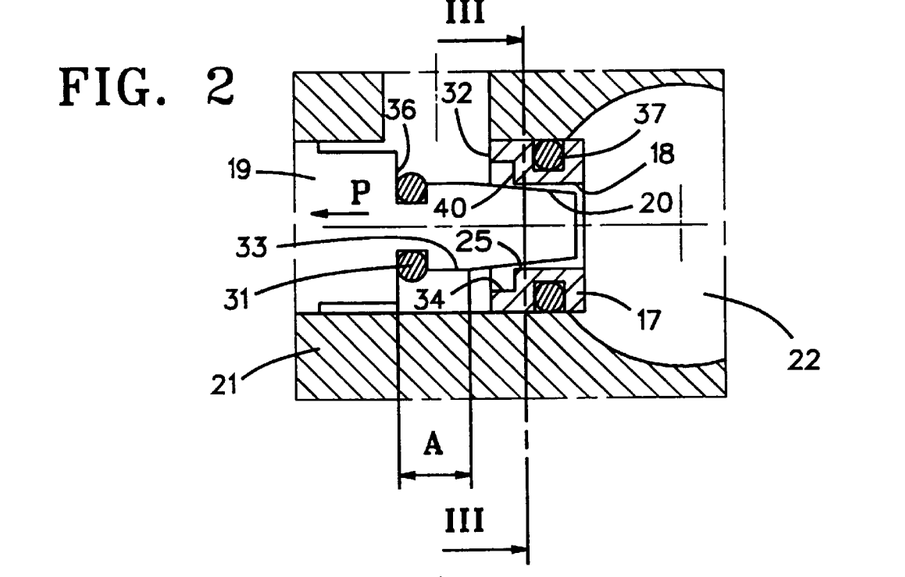
FIG. 2 is a detail F2 of FIG. 1 shown on a larger scale.
Figure 4:
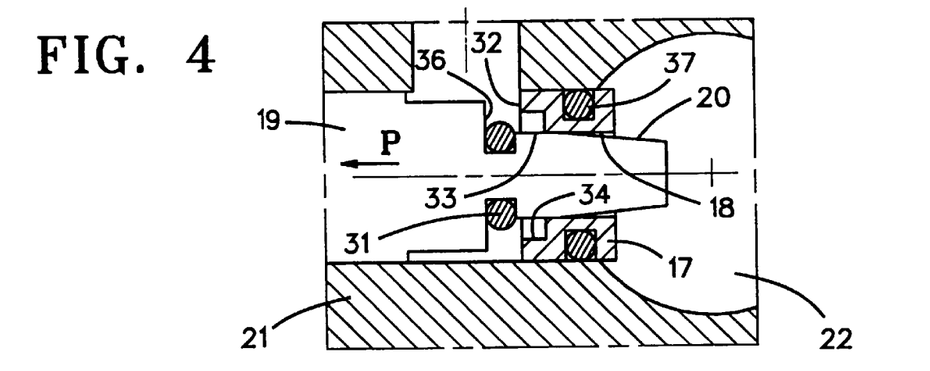
FIG. 4 is a section corresponding to FIG. 2 with the position of the valve components different from that of FIG. 2.
Figure 6:
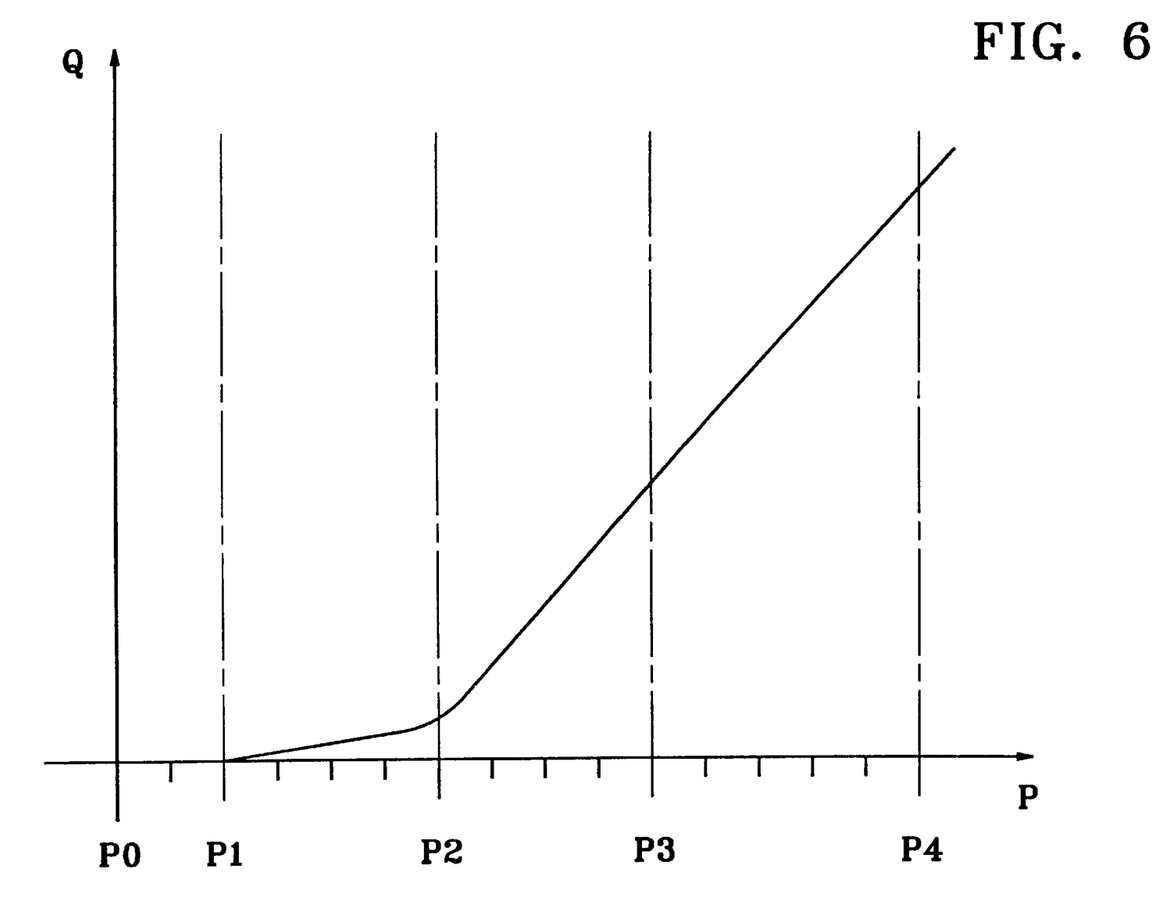
FIG. 6 is a graph showing the throttling by the valve of FIGS. 1 through 5 as a function of the valve-component positions.

FIG. 6 illustrates the flow Q of compressed air in relation to the position P of the plunger 19 of the throttling valve 11. This function is the result of the shapes of the plunger 19 and of the valve seat 17, in particular of the diameter of the inside surface 18 of the valve seat 17 as well as of the diameter of the proximal cylindrical segment 33 of the plunger 19 and the position of the annular groove 34, of the conicity of the distal plunger segment 20 and the axial length A shown in FIG. 2 between the annular shoulder 36 and the conical segment 20 of the plunger 19. When in the position $P_0$, the plunger 19 is in the position shown in FIG. 5. The throttling valve 11 is shut off, and the flow is zero. Then the plunger 19 moves in several steps in the direction P as shown in FIGS. 5, 4 and 2. Beginning with the position $P_1$ where the annular seal 31 detaches from the cylindrical surface 40 of the annular groove 34, a slight flow of air Q passes through the throttling valve 11, namely a so-called leakage flow determined by the play between the inside surface 18 of the valve seat 17 and the cylindrical segment 33 of the plunger 19 as well as by the axial length over which the cylindrical surface 18 and the cylindrical segment 33 of the plunger 19 are still cooperating, further by the distance between the annular seal 31 and the annular groove 34. Because of the elastic deformability of the annular seal 31, the position $P_1$ is not uniquely determined. The leakage flow however being minute, this indeterminacy entails no particular drawback.

Thereupon the plunger 19 moves on in several steps in the direction P and arrives at the position $P_2$ shown in FIG. 4. The cylindrical segment 33 of the plunger 19 has arrived at the end of the cylindrical inside surface 18 of the valve seat 17. If the position deviates further from this position $P_2$, the flow Q through the throttling valve 11 will rise more markedly because the inside surface 18 of the valve seat 17 henceforth cooperates with the conical segment 20 of the plunger 19, whereby the cross-section of the throttling gap 25 is enlarged and throttling is lowered, that is, the compressed air is throttled less. Thereafter the plunger 19 arrives at the positions $P_3$ and $P_4$ corresponding to FIGS. 2 and 1.

The range between the positions $P_2$ and $P_4$ of the plunger 19 of the throttling valve 11 is ideally suited for setting the flow Q reproducibly and very accurately. The plunger 19 and the valve seat 17 must be manufactured with correspondingly tight tolerances.

If the design is such that the plunger 19 requires for instance 100 steps of a stepping motor of a drive 27 between its positions $P_0$ and $P_4$, then this plunger 19 can be set into a correspondingly large number of positions with throttling gaps of different sizes.

The position of the plunger 19 is determined by a control and/or regulating unit for the stepping motor. The control and/or regulating unit is connected to a voltage source and feeds positive or negative voltage pulses applied to two or more terminals of the stepping motor.

In order to calibrate the drive 27 of the throttling valve, the stepping motor is fed with an appropriate number of pulses from the control and/or regulating unit so that, independently of its initial position, the plunger can be moved opposite the direction P toward the position shown in FIG. 5, wherein the rigid annular shoulder 36 of the plunger 19 rests against the rigid end surface 32 of the valve seat 17. After the plunger 19 has reached this position, further pulses of the same polarity no longer shall rotate the rotor 28 into the heretofore direction and accordingly will not move the plunger 19 any longer in the direction P. The plunger 19 then is located in the spatially fixed reference position $P_0$.

Thereupon, by predetermining the number of pulses to be fed to the stepping motor, the plunger 19 is displaced in precisely defined axial manner in the direction P and as a result the position of the plunger 19 and thereby the throttling level are determined as a function of the distance from the reference position $P_0$. The position of the plunger 19 no longer depends on the pressure of the reduced-pressure source, on the air impedance of the particular elements and/or on the flow of compressed air. Again vibrations will be without effect on the position of the plunger 19 and as a result the throttling valve 11 is vibration-insensitive. The individual positions of the plunger 19 can be predetermined very accurately by means of the control and/or regulating unit in relation to the reference position $P_0$ and therefore throttling can be predetermined very accurately too.

Moreover, play in the helicoidal gear set between the rotor 28 and the plunger rod 29 is also very easily compensated. For that purpose the particular required position of the plunger 19 may be entered only from one direction. If the plunger 19 must be moved opposite this direction into a new position P, it shall be displaced by a few steps past this desired position P and then it shall be moved back into the desired position in the specified direction of displacement. As a result play of the helicoidal gear set will be reliably without effect on the desired position of the plunger 19.

In a practical embodiment, the feed pressure of the compressed air may be between 2 and 7 bars and is regulated by a pressure regulator to a pressure up to about 1,000 mbars. The pressure then extant at the borehole 22 can be throttled by the throttling valve of the invention in the manner discussed above. The diameter of the plunger 19 in the region of its cylindrical segment 33 and the diameter of the cylindrical inside surface 18 of the valve seat 17 are approximately 3 to 4 mm. The conicity of the segment 20 of the plunger 19 is 5°. The relative motion of the plunger 19 and the valve seat 17 is about 4 to 7 mm. Such a throttling valve allows implementing this axial displacement for instance in 100 steps and illustratively the adjustment of throttling may be carried out in 10 mbar steps.

In an embodiment variation of the invention, the plunger 19 is stationary whereas the valve seat 17 is driven by a drive preferably also containing a stepping motor. In a further variation, both the plunger 19 and the valve seat 17 are fitted each with their own drive in order to be able to carry out relative motions.

Figure 7:
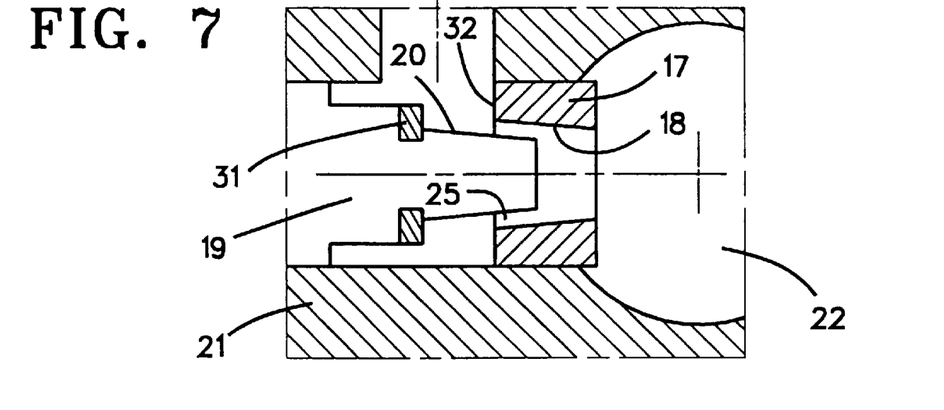
FIGS. 7 through 9 show valve components of another embodiment of a throttling valve in various positions of the valve components.
Figure 8:
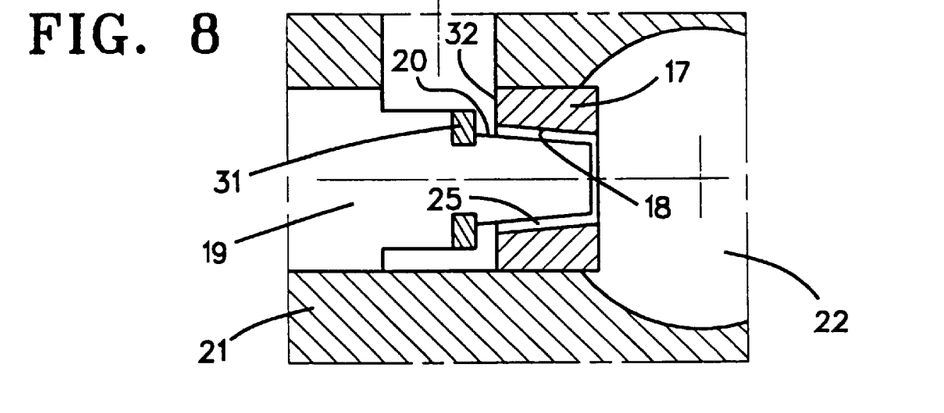
Figure 9:
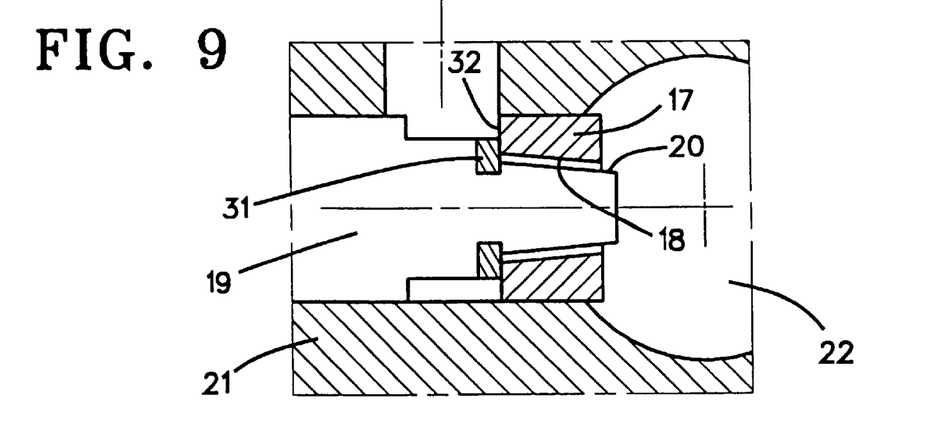

The embodiment shown in FIGS. 7 through 9 differs from that already described in relation to FIGS. 1 through 5 only by the shape of the inside surface 18 of the valve seat 17 and by the shape of the plunger 19. In this latter embodiment, the valve seat 17 is fitted with a conical inside surface 18 associated with a conical segment 20 of the plunger 19 adjoined by an annular seal 31 which, in the shutoff position (FIG. 9), will rest against the end surface 32 of the valve seat 17. A conical throttling gap 25 between the valve seat 17 and the plunger 19 is present in the embodiment of FIGS. 7 through 9.

Figure 10:
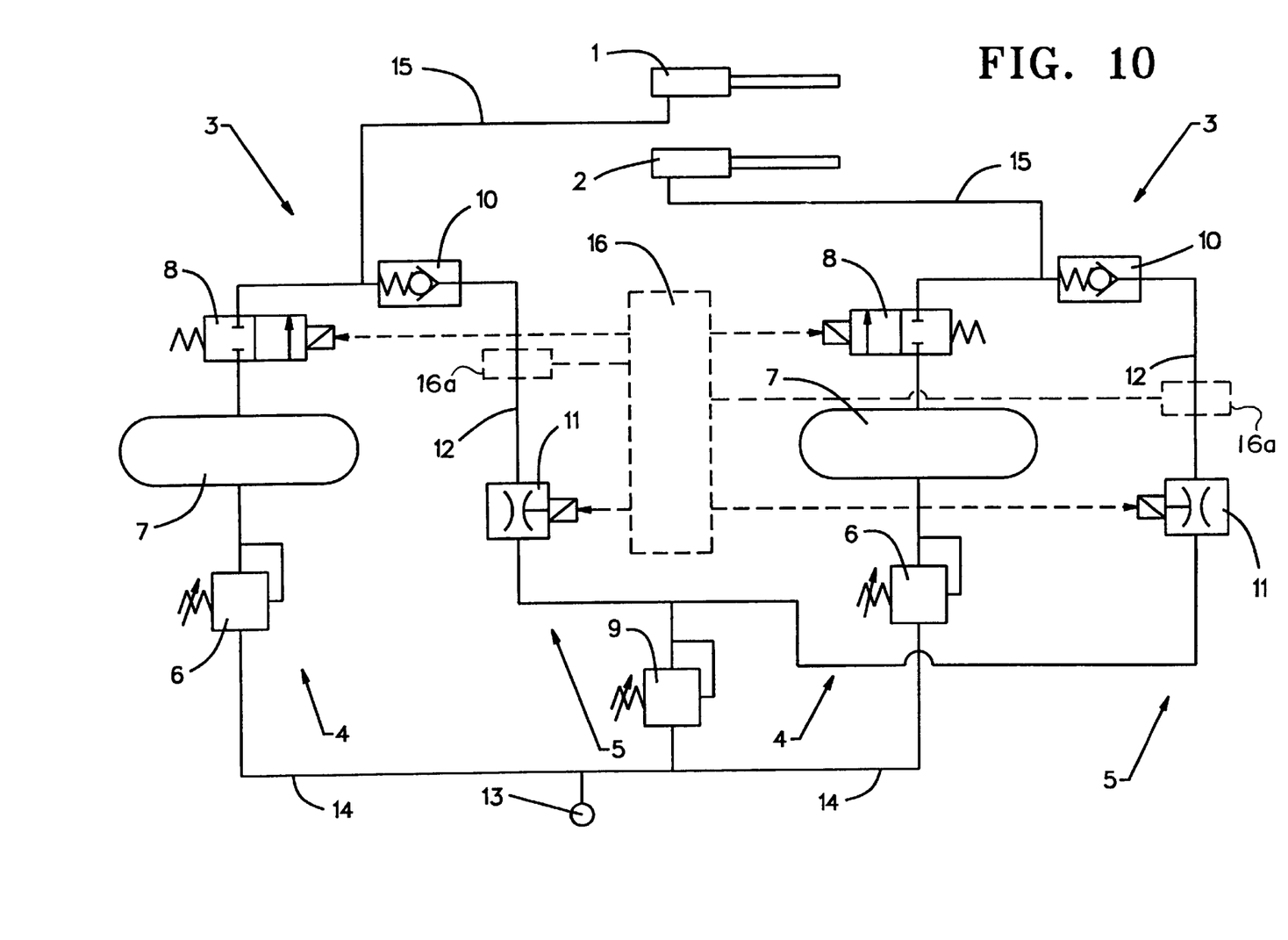
FIG. 10 is a functional diagram for the compressed-air feed to two main blowing nozzles of an airjet loom fitted with the throttling valves of the invention.

The throttling valve 11 elucidated in relation to FIGS. 1 through 9 is ideally suited for an airjet loom and is mounted therein as shown by the pneumatic functional diagram of FIG. 10.

FIG. 10 illustratively shows two main blowing nozzles 1, 2 of an airjet loom which are driven in predetermined sequences and then each will insert a filling into a shed wherein further filling transportation is supported in known manner by relaying nozzles.

Each of the main blowing nozzles 1, 2 is connected by a first branch 4 to a compressed-air source 13. This first branch 4 feeds high-pressure compressed air for instance between 2 and 7 bars to the main blowing nozzles 1, 2 for purposes of filling insertion. A pressure regulator 6, a pressure accumulator 7 and a main valve 8 are mounted between the compressed-air source 13 and each of the main blowing nozzles 1, 2. The pressure regulators 6 are adjustable. The main valve 8 is a magnetic valve and is opened by a control unit 16 to insert a filling and thereafter is closed again.

Each of the main blowing nozzles 1, 2 is connected through a further branch 5 to the compressed-air source 13 to feed low-pressure compressed air to the main blowing nozzles 1, 2. These two branches 5 comprise a common pressure regulator 9, one throttling valve 11 each of the design described in FIGS. 1 through 9, and one check valve 10 precluding the pressure, when released by the main valve 8, from entering these branches 5. The lines 14 of the branches 4 and the lines 12 of the branches 5 are combined by the main blowing nozzles 1, 2 into one line 15 in each case.

The control unit 16 allows adjusting the throttling valve 11 to different throttling gaps and hence to different, lower pressures at which the compressed air will flow toward the main blowing nozzles 1, 2. Basically the lower pressure is matched to the material of the filling and as a result, obviously when different fillings of different materials are inserted from the individual main blowing nozzles, correspondingly different low-pressure values will be set by the control unit 16 at the main blowing nozzles 1, 2. The throttling valve 11 is adjusted in such manner by the control unit 16 that during weaving within the filling pauses, that is when precisely one of the two main blowing nozzles 1 or 2 is not inserting a filling, these main blowing nozzles 1 or 2 shall be supplied with compressed air of lower pressure which however is high enough to reliably retain the particular filling in the main blowing nozzle.Experience shows that the danger of the filling dropping out of the main blowing nozzle 1 or 2 will be greatest when the filling is being cut and accordingly the control unit 16 may adjust the throttling valve 11 so that, during such a time interval, compressed air of higher pressure shall be supplied, the pressure of the compressed air thereafter being reduced by adjusting the throttling valve. If, depending on the weaving pattern, one of the fillings is not being inserted for some significant time, the control unit 16 may adjust by means of the throttling valve 11 a lower pressure for said time interval to prevent fraying. This pressure then will be raised again in timely manner before the next insertion of this filling. The control unit 16 will set the throttling valve to a further reduced pressure level in the case of loom shutdown, for instance when remedying thread rupture. The pressure level of the compressed air then being blown into the main blowing nozzles 1, 2 is determined in such manner that the particular fillings shall be reliably gripped while nevertheless being fraying-free and intact even upon prolonged exposure to this compressed air. Moreover the control unit 16 sets the throttling valve 11 to a pressure allowing guiding and sucking-in a filling at the intake of the main blowing nozzle 1 or 2. Such a pressure may be lower than that applied to the main blowing nozzles 1, 2 during weaving to hold the filling, but it will be larger than the pressure applied to the main blowing nozzles 1, 2 during interruption of operation. Furthermore the control unit 16 is able to fully shut off the throttling valve 11 and this feature is advantageous in some operational conditions. Also, in some cases, the check valve 10 may be fully eliminated.

In an embodiment variation, a pressure transducer 16a in lines 12 beyond the respective throttling valves 11, may be connected to the control-loop fitted control unit 16. As a result, it is possible to control and precisely maintain the desired pressure using the system constituting a control and regulating unit 16. In such a design the pressure regulator 9 ahead of the throttling valves 11 may be dropped.

The invention is not restricted to the shown and discussed illustrative embodiments used solely for elucidation. Equivalent designs, in particular regarding the drive 27 and/or the valve elements 17, 19, are within the realm of the expert.

Illustratively mutually rotatable valve components subtending a throttling gap also may be used. Two telescoping cylindrical mutually rotatable valve components may be used which are fitted with cross-boreholes made to coincide more or less by such a rotation, whereby a commensurately larger or smaller throttling gap and also a shutoff position may be set. In such a case one or both valve components are rotated by the drive containing a stepping motor and preferably also a reduction gear.

The main valve 8 and the throttling valve 11 shown in FIG. 10 may be mounted in practice in a common housing which where appropriate also contains the check valve 10 if at all present.

We claim:

1. A throttling valve for controlling flow of compressed gaseous fluid such as air, comprising:

first and second relatively movable valve components, the relative positions of which define an adjustable throttling gap between the components;

an electric drive connected to at least one of the valve components to move one valve component relative to the other to establish the size of a throttling gap between said components;

said electric drive comprising a stepper type motor displaceable by a control unit into predetermined positions, each position corresponding to a predetermined size of said throttling gap;

a control unit connected to the electric drive motor for selectively driving the motor into select ones of said predetermined positions and into a spatially fixed reference end position;

said valve components including a plunger and a rigid valve seat;

said plunger having a distal frusto-conical profile extending over a majority length of the plunger and an adjacent proximal cylindrical profile for cooperating with said valve seat;

said plunger further including a rigid radial shoulder terminating the cylindrical profile opposite to the frusto-conical profile, said shoulder being larger in diameter than said valve seat; said radial shoulder rigidly abutting said valve seat in the closed position, said closed position with the shoulder rigidly abutting said valve seat constituting said spatially fixed reference end position;

an airjet loom having at least one main filling blowing nozzle;

a source of compressed air; and at least one main valve for regulating cyclic flow of compressed air to said main nozzle;

said throttling valve controlling flow of compressed air from said source of compressed air to said at least one main nozzle when said valve is closed;

said throttling valve supplying compressed air from said compressed air source to said main blower nozzle at a lower pressure than air supplied to the nozzle by said main control valve;

said loom including a control unit programmable for different main nozzle operating conditions connected to said motor for controlling the size of the throttling gap and thereby the flow of air to said main nozzle in accordance with different desired main nozzle operating conditions;

a compressed air supply line between said at least one throttling valve and at least one main nozzle, and an air pressure sensor in said air supply lines;

said pressure sensor providing a pressure signal to said control unit;

said control unit programmed to process said air pressure signal and to control the electric motor in response to a processed air pressure signal in accordance with said different desired main nozzle operating conditions.

2. A method of operating a throttling valve for controlling flow of compressed gaseous fluid such as air, wherein the throttling valve includes first and second relatively movable valve components, the relative positions of which define an adjustable throttling gap between the components; an electric drive connected to at least one of the valve components to move one valve component relative to the other to establish the size of a throttling gap between said components; said electric drive comprising a stepper type motor displaceable by a control unit into predetermined positions, each position corresponding to a predetermined size of said throttling gap; said control unit connected to the electric drive motor for selectively driving the motor into select ones of said predetermined positions and into a spatially fixed reference end position; said valve components include a plunger and a rigid valve seat; said plunger having a distal frusto-conical profile extending over a majority length of the plunger and an adjacent proximal cylindrical profile for cooperating with said valve seat; said plunger further including a rigid radial shoulder terminating the cylindrical profile opposite to the frusto-conical profile, said shoulder being larger in diameter than said valve seat; said radial shoulder rigidly abutting said valve seat in the closed position, said closed position with the shoulder rigidly abutting said valve seat constituting said spatially fixed reference end position; comprising advancing said plunger by said stepper motor to cause engagement of said rigid radial shoulder with said rigid valve seat to establish the position of said plunger at said reference end position; and than incrementally moving said rigid radial shoulder away from said rigid valve seat by said stepper motor into selected ones of said predetermined positions to establish selected ones of said throttling gap, whereby said reference end position enables establishment of said throttling gap as a function of the distance said plunger has moved away from said reference position.

3. The method as claimed in claim 2, wherein said valve components include at least one resilient sealing element and a cooperating sealing surface that engage each other to seal the components relative to each other when the valve is in the reference end position, including moving said rigid radial shoulder fully to said rigid valve seat without interference or effect by said sealing element and sealing surface when advancing said plunger to establish said reference end position.

4. The method as claimed in claim 2, including driving the valve component connected to the drive motor through a reducing gear disposed between the drive motor and the respective valve component.

5. The method according to claim 4, including using a helicoidal gear set as the reducing gear between the drive motor and the respective valve component.

6. The method as claimed in claim 2, wherein the throttling valve is used in combination with an airjet loom having at least one main filling blowing nozzle; a source of compressed air; and at least one main valve for regulating cyclic flow of compressed air to said main nozzle; comprising the additional steps of:

controlling flow of compressed air from said source of compressed air to said at least one main nozzle via said throttling valve when said main valve is closed, including causing said throttling valve to supply such compressed air at a lower pressure than air supplied to the nozzle by said main valve.

7. The method as claimed in claim 5, wherein the airjet loom includes a loom control unit programmable for different desired main nozzle operating conditions connected To said electric drive, comprising the additional step of controlling the throttling gap by said loom control unit and therefore the flow of air to the main nozzle in accordance with said desired main nozzle operating conditions.

8. The method as claimed in claim 7, wherein the loom includes a compressed air supply line between said throttling valve and the at least one main nozzle and an air pressure sensor in said air supply line, comprising the additional steps of:

providing air pressure signals from said air pressure sensor to said control unit;

processing the air pressure signals in the loom control unit to produce processed control signals related to said different desired main nozzle operating conditions; and controlling the electric drive of the throttling valve in response to said processed control signals.

\* \* \* \* \*